US009430996B2

(12) United States Patent
Chu

(10) Patent No.: US 9,430,996 B2
(45) Date of Patent: Aug. 30, 2016

(54) NON-FOURIER SPECTRAL ANALYSIS FOR EDITING AND VISUAL DISPLAY OF MUSIC

(71) Applicant: David C. Chu, Menlo Park, CA (US)

(72) Inventor: David C. Chu, Menlo Park, CA (US)

( * ) Notice: Subject to any disclaimer, the term of this patent is extended or adjusted under 35 U.S.C. 154(b) by 668 days.

(21) Appl. No.: 13/917,551

(22) Filed: Jun. 13, 2013

(65) Prior Publication Data

US 2014/0372080 A1 Dec. 18, 2014

(51) Int. Cl.
*G06F 15/16* (2006.01)
*G10H 1/00* (2006.01)

(52) U.S. Cl.
CPC ...... *G10H 1/0008* (2013.01); *G10H 2210/066* (2013.01); *G10H 2210/395* (2013.01); *G10H 2220/005* (2013.01)

(58) Field of Classification Search
CPC ........................................................ G10H 7/00
USPC ........... 84/661, 622; 702/189; 704/203, 230; 708/290
See application file for complete search history.

(56) References Cited

U.S. PATENT DOCUMENTS

| | | | | |
|---|---|---|---|---|
| 3,884,546 | A | 5/1975 | Chu | |
| 5,149,902 | A * | 9/1992 | Washiyama ........... | G10H 1/125 708/290 |
| 5,663,666 | A | 9/1997 | Chu | |
| 6,480,126 | B1 | 11/2002 | Chu | |
| 6,738,143 | B2 | 5/2004 | Chu | |
| 6,952,175 | B2 | 10/2005 | Chu | |
| 7,622,665 | B2 * | 11/2009 | Kaneko .................. | G10H 1/125 84/622 |
| 9,037,454 | B2 * | 5/2015 | Yoon ................... | G10L 19/0212 704/203 |

OTHER PUBLICATIONS

Music Spectrograph App Updated (Mar. 2013) http://hotpaw.blogspot.com/2013/03/music-spectrograph-app-updated_7.html.

* cited by examiner

*Primary Examiner* — Lam Nguyen
(74) *Attorney, Agent, or Firm* — LaRiviere, Grubman PC

(57) ABSTRACT

System and method for identifying tones present in a short segment of digitized music stream, and for reporting simultaneously and quantitatively their respective magnitude and phase in near real time. Also captured are pitch deviations from the nominal tones of a predetermined music scale. The resulting spectral data can be scrolled manually from frame to frame to facilitate detail music evaluation and editing. The apparatus can also operate at real time to display notes being played, or to tone-activate audio-visual music enhancement and display with automatic synchronization.

16 Claims, 6 Drawing Sheets

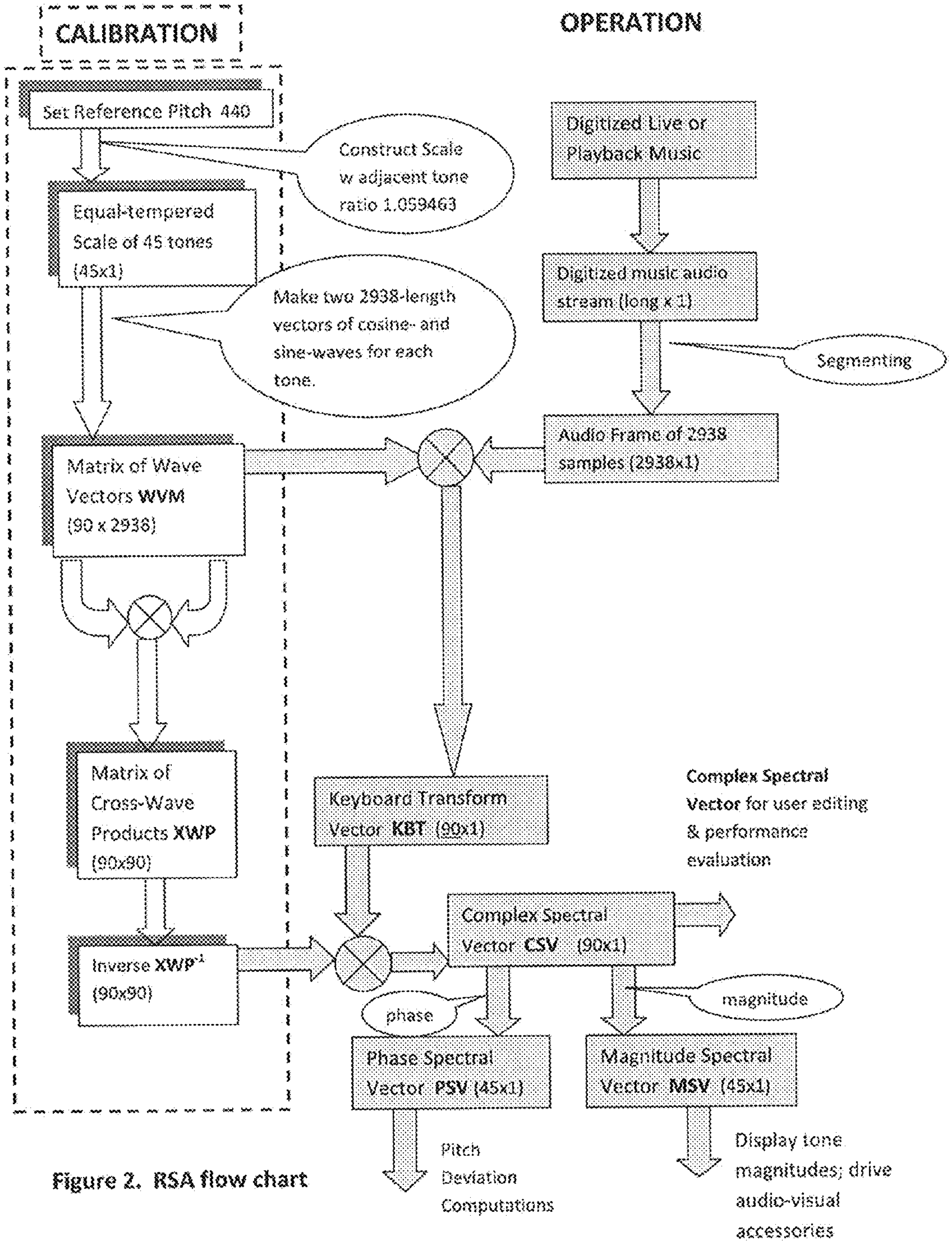
Figure 2. RSA flow chart

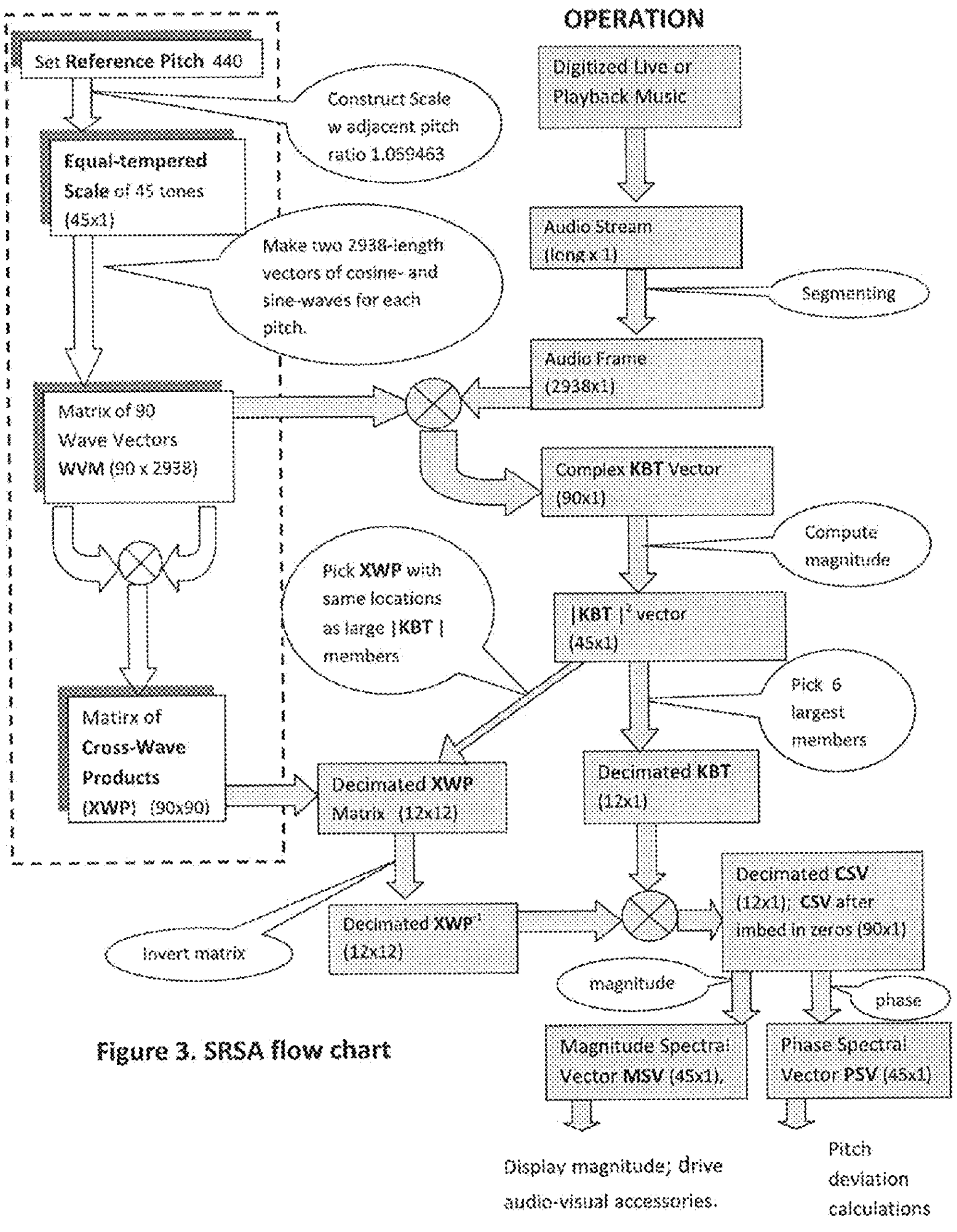
Figure 3. SRSA flow chart

FIG. 6 Frequency Deviation is computed from PSV of two consecutive frames by the algorithm described. Three tones of D-sharp are generated separately: on on pitch and the others off-pitch by 2% on either side. The first 10 values are computed by frames of 2938 each and a gap of 2 samples. The last value, for illustration, is computed by two frames overlapping by 1438, half a frame value.

NON-FOURIER SPECTRAL ANALYSIS FOR EDITING AND VISUAL DISPLAY OF MUSIC

COPYRIGHT STATEMENT

All material in this document, including the figures, is subject to copyright protections under the laws of the United States and other countries. The owner has no objection to reproduction of this document or its disclosure as it appears in official governmental records. All other rights are reserved.

TECHNICAL FIELD

The technical fields are audio-visual technology, computer technology, and measurement.

BACKGROUND ART

Performed music typically consists of notes played from a scale, such as an equal-tempered 12-tone scale. Different music notes, with their overtones, appear with different intensities and durations during the course of the performance. These tones generally span over several octaves. In harmonic and polyphonic music, a number of tones may be dominant in intensity (loudness) at one time. Time series music sound is usually digitized at some fixed sample rate such as a CD standard of 44.1 kHz. It is desirable to observe in the frequency domain music data quantitatively and accurately through spectral analysis.

Spectral analysis of sound, including music, is typically done with a Digital Fourier Transform (DFT) on the digitized signal. The aperture for DFT analysis is a time-series data of a fixed sample size. DFT spectral output is half that sample size in complex numbers, representing spectral content of the time series data. To take advantage of computational efficiency, a Fast Fourier Transform (FFT), an efficient method for some DFT computations, is usually employed. This is a well-known procedure.

The DFT/FFT approach to analyzing music for its spectral content has some disadvantages:

In a DFT, the resulting spectral components are linearly distributed into frequency bins, determined by sampling rate and sample size. To illustrate, a sample of 2,048 time series data taken at a sampling rate of 44.1 kHz are Fourier Transformed into 1,024 spectral bins equally spaced at 21.53 Hz apart. They are fixed at 0.00, 21.53, 43.07, 64.60, . . . , 22,028.47 Hz. In music, fundamental and overtones are not linearly, but rather logarithmically spaced. For example, in a 440 equal-tempered scale, starting with low E to two octaves above middle C, the tones are 82.41, 87.3, 92.5, . . . , 987.8, 1046.5 Hz. (See FIG. 1.) The Fourier spectral bins cannot be aligned with these tones, and therefore any DFT is necessarily an inexact spectral analysis for music. Also the frequency resolution of a DFT is too coarse to distinguish low tones. In the example, the two lowest music tones are separated by less than 5 Hz, but a FFT has a constant resolution of 21.53 Hz which is more than four times the low tone spacing. To improve frequency resolution using DFTs, frame size must be lengthened proportionately, widening the data gathering aperture and slowing the analysis process. With a frame size of 2,048, corresponding to an aperture time of 46.46 ms, and the analysis result is reported 21.5 times every second. Longer frames, with corresponding wider aperture, convolute the music structure being analyzed, slow the reporting rate, both of which are detrimental to analyzing rapid music. For FFTs, frame sizes are confined to powers-of-two samples, putting additional constraints to the process. Another undesirable aspect of Fourier analysis is called the Gibbs phenomenon, which causes obvious distortion at the edges of the output frame due to inappropriate boundary conditions. To minimize distortion, DFT users resort to modifying, in effect falsifying, input data in a process called "windowing" just to make the end-result "look" natural. Yet another undesirable aspect of Fourier analysis is its susceptibility to burst error, or "glitches". Even a single "wild" erroneous point creates large perturbation in the spectrum as Fourier Transform views it as a sharp impulse function, which is rich in spectral contents.

In summary, using FFTs to analyze music suffers from poor frequency resolution for low tones. Spectral components cannot be aligned with music tones, making spectral analysis necessarily imprecise. Restricting frame size to powers-of-two samples in FFTs places further constraints. FFTs are susceptible to sizeable distortion due to glitches and the Gibbs phenomenon.

SUMMARY OF THE INVENTION

This invention, which I will call Regression Spectral Analysis (RSA), is more suited to analyzing music than DFTs. RSA eschews the use of Fourier Transform in the spectral analysis of music. Instead, it uses regression techniques from statistics to min-squared best-fit a mathematical projection of a music vector onto a set of vectors of a predefined set of tones. Analysis produces a "best" estimate of the magnitude and phase of individual music tones present. The number of tones in a typical music scale is limited. A piano has about eighty some notes. A chorus of mixed singers covers half that range. Instead of thousands of badly placed frequency bins in FFT, RSA frequency bins are the nominal music tones themselves, therefore are much less numerous. Less computation is required and more precision results. Glitches are effectively averaged out by the "best-fit" process, causing minimal distortion to the result. There is no distortion on spectrum frame boundaries due to Gibbs phenomenon, thus no extraneous "windowing" of music data is necessary. In RSA, data frames are not limited to powers-of-two samples, and can be optimally chosen to trade-off between low-note coverage and analysis agility.

BRIEF DESCRIPTION OF THE DRAWINGS

FIG. 2 shows an embodiment of the RSA process flow. On the left is a calibration process. It establishes a predetermined music scale, a Wave Matrix WVM consisting of cosine and sine vectors for each tone in the scale for the duration of the audio frame, cross-multiplies WVM (i.e. multiplies WVM by its own transpose), and produces the matrix XWP. It inverts XWP to obtain $XWP^{-1}$. The calibration process needs to be performed only once until the scale is redefined, and need not operate in real time.

On the right is the operation process flow of RSA. This can be done in real time for driving visual display or in stop-frame mode for music evaluation and editing. It segments the long audio stream into Audio Frames, which are represented as vectors whose number of dimensions equals the number of samples in the Audio Frame, and whose components are discrete amplitude values. Each Audio Frame vector is multiplied by the WVM from calibration to form the Keyboard Transform KBT. The KBT is not the final result in RSA as its basis vectors are not orthogonal. The final analysis result is the complex spectral vector CSV. Standard rectangular-to-polar conversion produces real vectors Magnitude Spectral Vector MSV and Phase Spectral Vector PSV.

FIG. 3 shows an alternate embodiment SRSA to analyze only the significant tones indicated by |KBT|. Only subsets of tones from KBT and XWP are selected, producing a decimated-KBT and a decimated-XWP. Multiply the decimated-KBT by the inverse of the decimated-XWP to produce a decimated-CSV. The full CSV is obtained by noting the original position of selected tones and filling the unselected tones with zeros. Rectangular-to-polar conversion of CSV generates a Magnitude Spectral Vector MSV and a Phase Spectral Vector PSV.

Figure 1A:
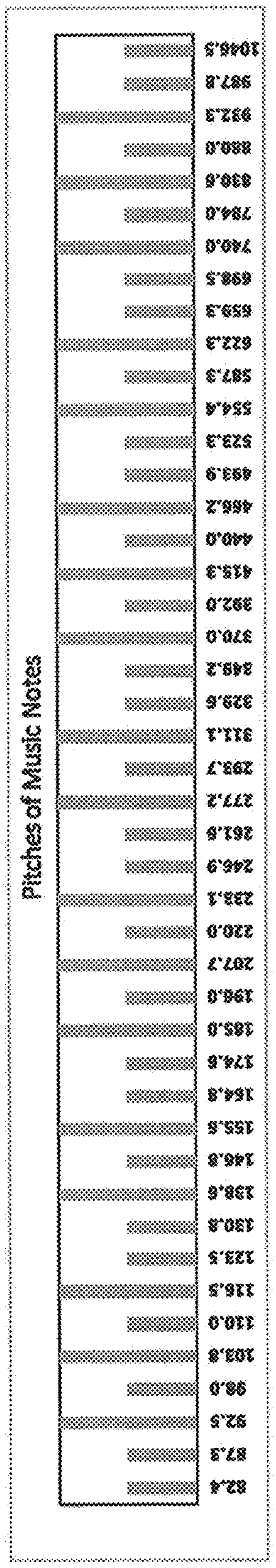
FIG. 1A shows a typical equal tempered 12-tone music scale. The pitches are evenly placed on a log-scale. Longer stems correspond to the "black keys" one might find on a keyboard.
Figure 1B:
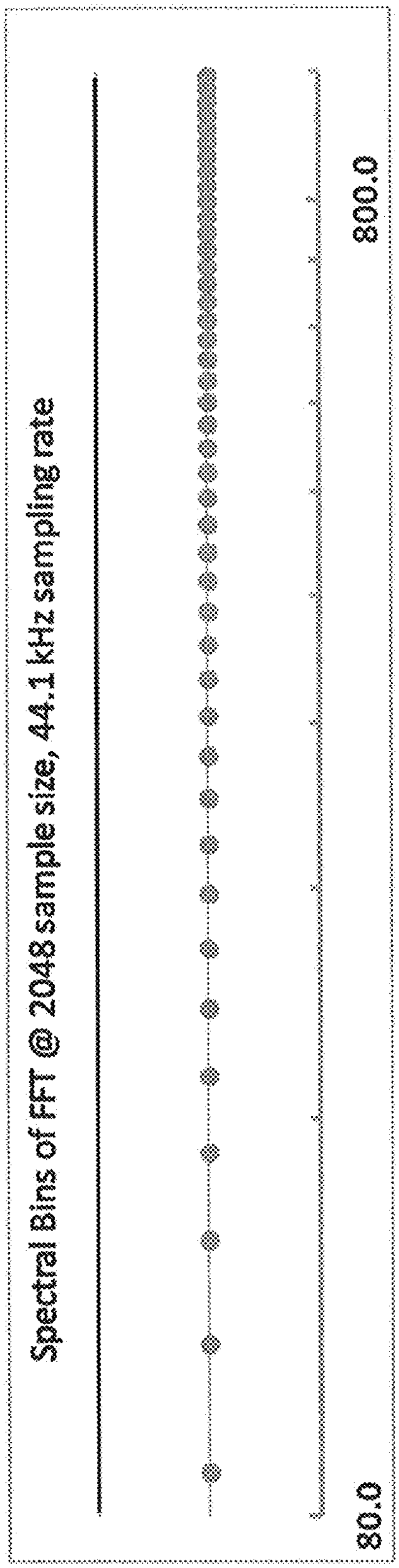
FIG. 1B shows the FFT spectral bins. They are evenly distributed on a linear scale and will appear to be uneven on a log-scale. There is no hope of aligning the FFT spectral bins with music tones. Note also the sparseness of the FFT bins at the low frequency end, far insufficient to distinguish between low notes.
Figure 4A:
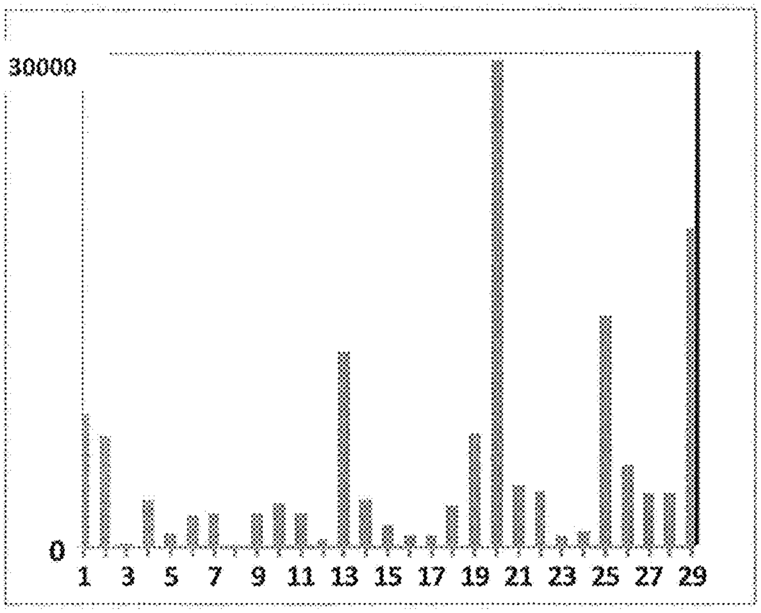

FIG. 4A shows the |KBT| of a synthesized "trombone" D-sharp. The note itself and its overtones are prominent. But others tones are non-zero even though they are not actually present.

Figure 4B:
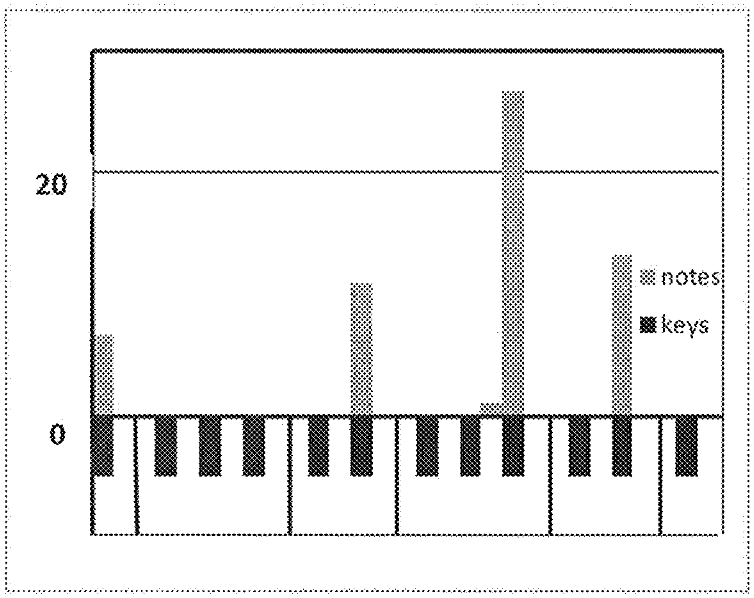

FIG. 4B shows the MSV of the same "trombone" D-sharp after multiplication of KBT by $XWP^{-1}$ removed the non-existent tones. The note itself and its overtones are prominent. The small presence in the tone A is due to the actual note received is actually slightly off-key. Actual pitch deviation is not shown in this figure.

Figure 5A:
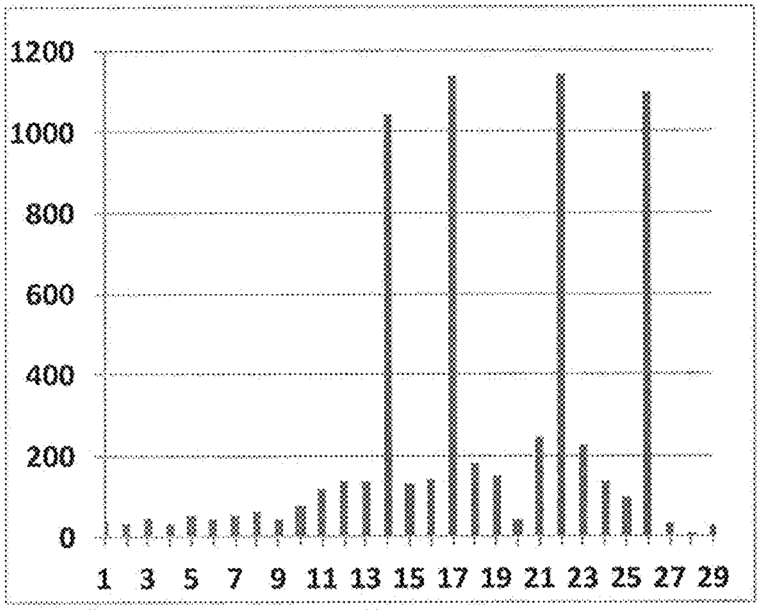

FIG. 5A shows the |KBT| of a simulated first inversion C-major chord with no overtones. The notes themselves are prominent. But others tones are non-zero even though they are not actually present.

Figure 5B:
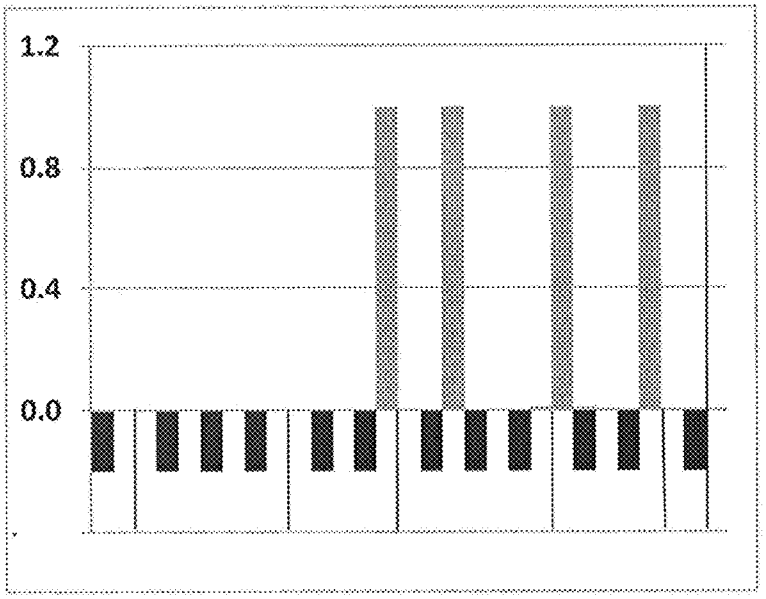

FIG. 5B shows the MSV of the same C-major chord. The non-existent tones are removed. The notes are accurately portrayed with magnitude 1.0, in agreement with the simulated data. Random changes in phase of input data causes no change in the MSV but are accurately captured in PSV (not shown).

Figure 6:
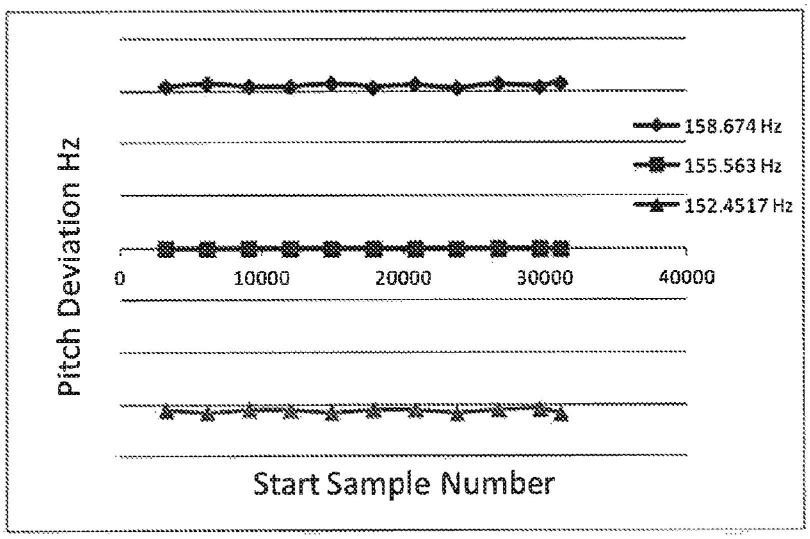

FIG. 6 shows the result of pitch deviation analysis for D-sharp for three tones (not simultaneously applied), one 2% flat, one on pitch, and one 2% sharp for 10 consecutive frames. Pitch deviations are accurately captured.

Figure 7:
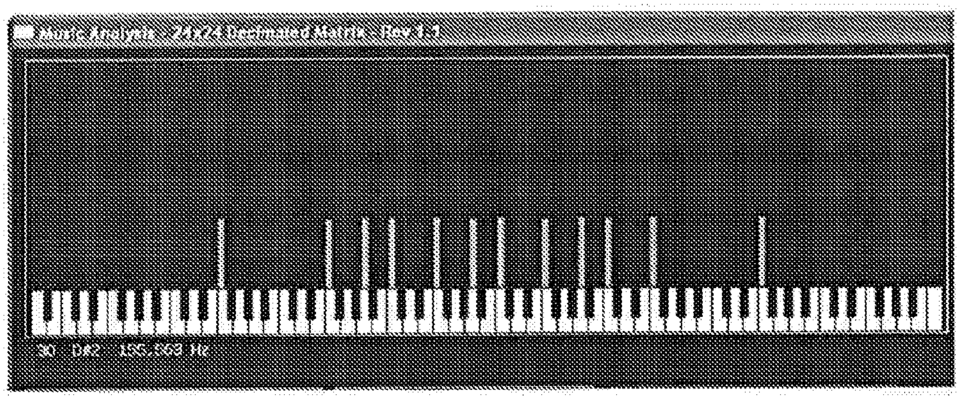

FIG. 7 depicts the precision of SRSA even while covering audio including concurrent tones that span 5 octaves.

DESCRIPTION OF THE EMBODIMENTS

The following describes preferred embodiments. However, the invention is not limited to those embodiments. The description that follows is for purpose of illustration and not limitation. Other systems, methods, features and advantages will be or will become apparent to one with skill in the art upon examination of the following figures and detailed description. It is intended that all such additional systems, methods, features and advantages be included within this description, be within the scope of the inventive subject matter, and be protected by the accompanying claims.

A specific invention embodiment and example application illustrates well the RSA process. By way of non limiting example, let us examine a coverage range that spans 45 tones from a low F (87.307) to a high C-sharp (1108.731) on a 12-tone equal-tempered scale. Source data is from a digital audio music stream in CD format. The stream is segmented into consecutive 66.67 ms audio frames of 2,938 samples for analysis. Results are reported 15 times a second, or every 2,940 samples, after each frame, in the form of the magnitude and phase of each tone detected within that frame. These sample numbers are purposely chosen to illustrate that a gap of two samples between frames causes no observable disturbance in the analysis. A few of the inexhaustible illustrative examples are explored showing how the data can be used to monitor, archive, characterize, evaluate, and edit the audio. Other examples show how the analysis can be used in real time to drive tone-based visual display of the music or electronic instrument accessories. It should be noted that RSA is scale, range, and frame size agnostic. Other embodiments of the invention with different ranges, frame sizes, and arbitrary scales are accommodated by RSA without deviation from the basic approach. RSA can also accommodate overlapping as well as non-contiguous frames or losses or breaks in stream data with no ill effect.

There are two distinct parts in the process of real-time regression spectral analysis (RSA) for music:

1. Instrument calibration; and
2. Analysis operation.

Performing a new calibration is necessary only when analyzing new music tuned to a different scale. The left side of FIG. 2 circumscribed by dotted lines shows the calibration process. The right side of FIG. 2 shows the continuous analysis operation for each 66.67 ms frame.

RSA Instrument Calibration Process

First a scale, described by a fixed range of discrete frequencies, must be selected. This scale can contain any finite range of or collection of nominal frequencies or pitches. The pitches need not be "evenly" or "regularly" spaced, need not contain octaves, etc. The number of pitches is limited solely by computing power and computational precision. The upper and lower bounds are limited only by the quality of the sample data to be used in the analysis phase. The proximity of adjacent tones is limited by potential singularity in the matrix inverse operation.

For the purposes of illustration, let us use a common 12-tone equal-tempered scale of 45 tones with a reference pitch of 440 Hz (commonly referred to by musicians as "A4", or the "A above middle C"). Constructing a 12-tone equal-tempered scale of 45 tones starts with that reference pitch. All other tone-pitches are referenced to it by the fixed ratio of r, the twelfth-root of 2 between adjacent tones:

$$p_n = p_{ref} r^{n-29}$$

where:

$p_{ref}$ is the reference pitch in Hz (e.g., 440)

A 45 tone scale where $p_{ref}$ is 440 Hz, and n is in the range [1, 45], would be:

| | | |
|---|---|---|
| low F: | n = 1, | $p_1 = 440r^{-28} = \sim 87.307$ Hz |
| low F-sharp: | n = 2, | $p_2 = 440r^{-27} = \sim 92.499$ Hz |
| . . . | | |
| G4-sharp: | n = 27, | $p_{27} = 440r^{-1} = \sim 415.305$ Hz |
| A4 (reference): | n = 28, | $p_{ref} = 440r^0 = 440.000$ Hz |
| A4-sharp: | n = 29, | $p_{29} = 440r^1 = \sim 466.164$ Hz |
| . . . | | |
| high C: | n = 44, | $p_{44} = 440r^{15} = \sim 1046.502$ Hz |
| high C-sharp: | n = 45, | $p_{45} = 440r^{16} = \sim 1108.731$ Hz |

To re-tune, to Baroque 415 for example, the reference pitch would be changed to 415, and the values recalculated.

Again, RSA is scale agnostic. Other scales use other algorithms to assign tone pitches. Even arbitrary values may be used.

Let P be the set of tone pitches in the scale, from $p_1$ to $p_m$, where m is the number of tones. In our example, m is 45, $p_1$ is a low F, and $p_m$ or $p_{45}$ is a high C-sharp).

Let S be the number of samples in the audio frame, and let $F_s$ be the sample frequency in Hz. In our example, S is 2,938, and $-F_s$ is 44.1 kHz or 44,100.

Now, for each $p_n$ in the set of tone pitches $p_1$, through $p_m$ construct two Wave Vectors, each of length s, as follows:

For vector index i in [0, S−1]:

$$C(p_n, i) = \text{Cosine vector with pitch } p_n \text{ and index } i = \cos 2\pi i\left(\frac{p_n}{F_s}\right)$$

$$S(p_n, i) = \text{Sine vector with pitch } p_n \text{ and index } i = \sin 2\pi i\left(\frac{p_n}{F_s}\right)$$

Or, in our example:

For vector index i in [0, 2937]:

$$C(p_n, i) = \text{Cosine vector with pitch } p_n \text{ and index } i = \cos 2\pi i\left(\frac{p_n}{44100}\right)$$

$$S(p_n, i) = \text{Sine vector with pitch } p_n \text{ and index } i = \sin 2\pi i\left(\frac{p_n}{44100}\right)$$

Form a Wave-Matrix WVM with the Wave Vectors by "stacking" first the Cosine vectors, then the Sine vectors. The first m rows are the Cosine vectors in ascending pitches, and the last m rows are the Sine vectors in the same order. The matrix then has 2m rows and S columns:

$$WVM = \begin{bmatrix} \cos 2\pi 0\left(\frac{p_1}{F_s}\right) & \cdots & \cos 2\pi(S-1)\left(\frac{p_1}{F_s}\right) \\ \vdots & \ddots & \vdots \\ \cos 2\pi 0\left(\frac{p_m}{F_s}\right) & \cdots & \cos 2\pi(S-1)\left(\frac{p_m}{F_s}\right) \\ \sin 2\pi 0\left(\frac{p_1}{F_s}\right) & \cdots & \sin 2\pi(S-1)\left(\frac{p_1}{F_s}\right) \\ \vdots & \ddots & \vdots \\ \sin 2\pi 0\left(\frac{p_m}{F_s}\right) & \cdots & \sin 2\pi(S-1)\left(\frac{p_m}{F_s}\right) \end{bmatrix}$$

In our example:

$$WVM = \begin{bmatrix} \cos 2\pi 0\left(\frac{p_1}{44100}\right) & \cdots & \cos 2\pi 2937\left(\frac{p_1}{44100}\right) \\ \vdots & \ddots & \vdots \\ \cos 2\pi 0\left(\frac{p_{45}}{44100}\right) & \cdots & \cos 2\pi 2937\left(\frac{p_{45}}{44100}\right) \\ \sin 2\pi 0\left(\frac{p_1}{44100}\right) & \cdots & \sin 2\pi 2937\left(\frac{p_1}{44100}\right) \\ \vdots & \ddots & \vdots \\ \sin 2\pi 0\left(\frac{p_{45}}{44100}\right) & \cdots & \sin 2\pi 2937\left(\frac{p_{45}}{44100}\right) \end{bmatrix}$$

Create a Cross-Wave Product Matrix XWP by multiplying the Wave-Matrix WVM by its own transpose $WVM^T$. The XWP matrix is square with 2m rows and 2m columns.

$$XWP = WVM \cdot WVM^T$$

Invert the XWP matrix to create the inverse $XWP^{-1}$. It is commonly known that inverting a matrix this large or larger accurately usually requires precision computation tools available to scientists. Persons of ordinary skill in the art will appreciate that matrix inversion is performed "off-line" only once per calibration in RSA and is not performed in the analysis operation. Time requirement aside, computing very large matrix inverse proves difficult to do with sufficient precision for satisfactory results.

Identifying and quantifying a range of tones (e.g., a music scale), computing the Wave Matrix WVM, and computing its Inverse Cross-wave Matrix $XWP^{-1}$ completes the calibration process for RSA.

RSA Analysis Operation Process

Music in digital format, whether it is digitized from a live performance or a playback from a recording, consists of long streams of data, with one stream per channel. The right side of FIG. 2 labeled OPERATION depicts the analysis operation for one channel. Other channels can be simultaneously processed using the same Wave Vectors WVM and the $XWP^{-1}$ Matrices.

In our example, the long stream of data is segmented into frames of 2,938 samples, giving an analysis aperture of 66.62 ms. For a standard sampling rate of 44.1 kHz, 15 frames are analyzed every second. Frame size must be large enough to accurately discern low tones and small enough not to confound fast moving music. In RSA, frame size is not confined to powers-of-two samples. The frames are sequential, but need not be exactly contiguous. A small gap between frames, e.g. two-sample in the example, has little perturbing effect on the spectrum as long as it is known and accounted for in timing calculations.

By way of continuing our example, to perform the analysis phase, multiply each frame of 2,938 samples, now called the Audio Frame, by the set of vectors in the Wave Matrix WVM. In precise mathematical terms, perform a matrix multiplication of the (90×2,938) matrix WVM and the (2,938×1) Audio Frame Vector. The result is a (90×1) vector designated as Keyboard Transform Vector KBT. The complex KBT is analogous to, but distinctly different from, the Digital Fourier Transform DFT of the Audio Frame vector. In DFT, the set of basis vectors are mutually orthogonal. In KBT, they are not. Even a pure tone may spill into several bins of KBT. While imprecise, vector KBT is a strong indicator of where the significant tones are. KBT is an intermediate and not the final product of RSA. It needs to be "cleaned up".

To perform such a "clean up", produce a (2m×1) Complex Spectral Vector CSV by multiplying matrices $XWP^{-1}$ and KBT. Multiplication by $XWP^{-1}$ minimizes, in a "best fit" manner, contents in the tonal bins in KBT that are not caused by spectral components of the Audio Frame as an artifact of using non-orthogonal wave-vectors. The CSV is essentially a vector of m complex numbers. It contains quantitative information of both magnitude and phase (in rectangular form) of detected tones in the frame. CSV, in polar form magnitude and phase, is the desired end-product of RSA.

To convert from rectangular-form to the more useful polar form of magnitude and phase for the m tones in the scale, index n from 1 to m, perform the standard transformation:

$$\text{Magnitude: } MSV(n) = \sqrt{CSV^2(n) + CSV^2(n+m)}$$

$$\text{Phase } \Phi(n)\text{: } PSV(n) = \frac{\text{Atan2}[CSV(n+m), CSV(n)]}{2\pi}$$

A tan 2[y, x] will be apparent to those skilled in the art to mean a four-quadrant arctangent function in radians with the respective rectangular coordinate arguments. Phase angles are expressed in units of cycles through division by 2π. The above will result in a Magnitude Spectral Vector MSV and a Phase Spectral Vector PSV.

In our example, for each n from 1 to 45:

$$\text{Magnitude: } MSV(n) = \sqrt{CSV^2(n) + CSV^2(n+45)}$$

$$\text{Phase } \Phi(n)\text{: } PSV(n) = \frac{\text{Atan2}[CSV(n+45), CSV(n)]}{2\pi}$$

In FIG. 4B, the Magnitude Spectral Vector MSV of the note D-sharp and its three overtones are displayed over a horizontal axis of 29 tones shaped like a keyboard showing the nominal musical locations of these tones. In practice, their actual pitches may deviate somewhat from the nominal values. Vibrato, instrument de-tuning, off-key singing, stylistic scooping, as well as music tuned to a scale not exactly at 440, are all examples when the actual pitch may deviate from the nominal, be it intentional or unintentional, momentary or persistent.

Method to Obtain Pitch Deviation from RSA Data

Pitch deviation can be obtained from phase spectral vector PSV phases in two consecutive frames. This allows actual tone pitches contained the Audio Frame to deviate from the nominal and the deviation can be calculated for any tone, particularly those tones which are prominent. Small tones in the background noise level will not produce meaningful results.

The procedure for determining frequency deviation for a specific tone is best illustrated by an example. A "trombone" note C-sharp was synthesized and analyzed by RSA with a frame size s of 2,205. The MSV magnitudes are shown in FIG. 4. The base note is seen to be significant even though its overtones are larger. The nominal frequency for C-sharp is 155.56 Hz from the 440 scale. The time from one frame to the next is 2,205/44,100 or 1/20 of a second. The number of cycles in one frame is nominally 155.56/20 or 7.7780 cycles. From the PSV, the phases of the same tone in two consecutive frames are 0.04277 and −0.11344 cycles respectively. This implies that the actual phase advancement of 7.8438 cycles (to the nearest 1 cycle), which is slightly more than 7.7780 cycles. The actual pitch is therefore 156.87 compared to the nominal pitch of 155.56 by this ratio of (7.8438/7.7780=1.00846), which is 14.3 "cents" in tuning jargon, which places 100 cents between semitones. The frequency deviation measured is (156.87−155.56) or 1.31 Hz higher than (or "sharp of") the nominal frequency.

More precisely stated, the phase deviation A) for this example is =[−0.11344−0.04277+Q]−[155.563×(1/20)]=[−0.15621+Q]−7.7780. Q is a whole number which should be chosen to minimize |Δp|, or make it nearest zero. For example, for Q=8, Δp=0.06579 which is the smallest in absolute value. (9 would give 1.06579 and 7 would give −0.93421, both of which would result in a larger absolute values. Other integers would result in values even further from zero.) The pitch deviation Δp would then be ΔΦ/(1/20)≈+1.31 Hz. Generally:

$$\Delta\Phi_n = [\Phi_n(c) - \Phi_n(c-1) + Q] - [p_n \cdot T]; \text{ and}$$

$$\Delta p_n = \frac{\Delta\Phi_n}{T}$$

where c is the current audio frame, c−1 is the previous audio frame, each Φ are data from PSV expressed in cycles, and $p_n$ is the nominal pitch in Hz of the prominent tone n in question. The factor T is the time of consecutive frames, including any gaps or overlaps.

Pitch deviation calculation may continue for any prominent tones. If the pitch deviation is found to be fluctuating at a few hertz rate, then it is vibrato. The extent and rate characterize this vibrato. If the deviation is constant and does not vary with time, then it is due to de-tuning. It can be both, vibrato and detuning, if the deviation fluctuates about an offset.

Another method of illustrating frequency deviation, favored by instrument tuners, is to observe a spinning inhomogeneous disc, the direction of spin signifies sharp or flat, and the rate of spin signifies the amount of detuning, with a frozen disc signifying in-tune. This can be accomplished with PSV data Φ, for any prominent tone n:

$$\theta_n(c) = \theta_n(c-1) + \Phi_n(c) - \Phi_n(c-1) - p_n \cdot T$$

where the $\theta_n(c)$ is the current disc angle $\theta_n(c-1)$ is the disc angle in the previous frame. The range for $\theta_n$ is [0, 1] as it spins, ignoring all whole revolutions. $\Phi_n(c)$ and $\Phi_n(c-1)$ are PSV values for the current frame and previous frame respectively. T is the time of consecutive frames, including any gap or overlap.

FIG. 5A shows the |KBT| magnitude plot of simulated music data of a C-major chord (first inversion) with unity magnitude for each tone. Though the four tones are dominant, other tones are not zero due to the non-orthogonality of basis vectors of musical tones as described above. FIG. 5B shows the effect of multiplication by $XWP^{-1}$ which correctly identified the four notes of their magnitudes and pitches, and removing non-existent tones shown in |KBT|, demonstrating the effectiveness of Regression Spectral Analysis. Random change in phases of the four notes affects |KBT| but not MSV, confirming effectiveness of the method.

FIG. 6 depicts the pitch deviation computed from PSV data of two consecutive frames by the algorithm described. Three tones of D-sharp are generated separately: one on pitch and the others off-pitch by 2% on either side. It also illustrates the invention's effectiveness when dealing with gaps or overlaps in audio frames. The first 10 values are computed by frames of size 2,938 each with a gap of 2 samples. The last value, for illustration, is computed by two frames overlapping by 1,468 (i.e., half a frame value).

Applications of RSA Data to Music Evaluation, Editing, and Visual Display of Music The following are but a few of the nearly limitless uses of RSA. RSA now makes forms of editing accessible that were previously very difficult, if not impossible. By using magnitude and phase data provided by MSV and PSV, individual tone magnitudes can be modified to create different tone qualities without otherwise changing the music. For example, to remove one offending tone, one would add to the music vector a tone of the same frequency and magnitude but opposite in phase as expressed by MSV and PSV. This can be done even in the presence of other notes. The same can be done to overtones of the offending note.

Why does a particular violin, or voice, or organ pipe sound better than another? RSA can be a tool for technical analysis by experts through observing the relative magnitudes, perhaps even phases, of overtones for the same notes played or sung.

A spinning wheel visual display may depict pitch deviation, with direction and rotation rate indicative of polarity and extent of the deviation. Application to tuning musical instrument is obvious.

Visual Display of music can be controlled by individual tones with data from MSV. Different colors may illuminate whenever specific chords are detected. The possibilities are endless, limited only by the artistry of the display programmer. Tones identified can be used to electronically activate audio accompaniment accessories in near real time. One important difference from previous visual display or audio accompaniment techniques is that they are music content-activated in real time, providing automatic synchronization without detailed prior knowledge of the music through a score, and without beat-by-beat human intervention.

Selective Regression Spectral Analysis (SRSA), an Alternate Embodiment

The analysis process shown in FIG. 2 is very comprehensive, encompassing all the tones in the scale and clearly discerning all tones from all others. As a result, a great deal of unproductive yet difficult computation involving inverting large matrices is employed to discern one insignificant tone from other insignificant tones. In practice, however, only a few notes are actually being played at a given time. Therefore, one only needs to discern these notes, together with their overtones, from one another within the frame.

There is an alternative method to use Regression Spectral Analysis (RSA) on a selected number of prominent tones determined by the |KBT|.

However, RSA can be applied only to the most prominent tones indicated by $|KBT|^2$. It will validate the truly prominent tones and eliminate tones, which only appear to be prominent. By doing so, computation is reduced without sacrificing accuracy. The assumption, shown to be valid, is that truly prominent tones will appear to be prominent in $|KBT|^2$, but not every prominent KBT tone is truly prominent.

FIG. 3 illustrates the calibration and analysis processes for Selective Regression Spectral Analysis (SRSA). Many of the steps are the same as the comprehensive RSA. The necessity to invert large matrices off-line is replaced by inverting much smaller matrices on-line.

Calibration Process for SRSA

Identify a set of tones P. Let S be the number of samples in the audio frame, and let $F_s$ be the sample frequency in Hz. In our example, P is a 12-tone equal-tempered scale of 45 tones includes a reference pitch, such as a common 440 for A, S is 2,938, and $F_s$ is 44.1 kHz or 44,100.

For each $p_i$ in the set of tone pitches P, construct two Wave Vectors, each the same length as the sample size S, as follows:

For vector index n in [0, 2937];

$$C(p_n, i) = \text{Cosine vector with pitch } p_n \text{ and index } i = \cos 2\pi i\left(\frac{p_n}{44100}\right)$$

$$S(p_n, i) = \text{Sine vector with pitch } p_n \text{ and index } i = \sin 2\pi i\left(\frac{p_n}{44100}\right)$$

Form a Wave-Matrix WVM with the Wave Vectors by "stacking" first the Cosine vectors, then the Sine vectors. In our example, the first 45 rows are the Cosine vectors in ascending pitches, and the last 45 rows are the Sine vectors in the same order. The matrix then has 90 rows and 2,938 columns. The order in which the vectors are placed is immaterial as long as it is consistent, and uniquely represents the tones in the scale.

Create a Cross-Wave Product Matrix XWP by multiplying the Wave-Matrix WVM by its own transpose $WVM^T$. The XWP matrix is square with 90 rows and 90 columns. Thus far, the operations of RSA and SRSA are identical. However, SRSA eliminates the computationally expansive step of calculating $XWP^{-1}$.

Identifying and quantifying a range of tones (music scale), computing the Wave Matrix WVM, and the Cross Wave Matrix XWP completes the calibration process of SRSA.

SRSA Analysis Operation Process

The right side of FIG. 3 labeled OPERATION depicts the analysis operation for one channel.

The beginning operations of RSA and SRSA are the same. The long stream of data is segmented into frames of 2,938 samples, giving an analysis aperture of 66.67 milliseconds (ms). For a standard sampling rate of 44.1 kHz, 15 frames (or 2,940 samples) are analyzed every second. Multiply each frame of 2,938 samples, now called the Audio Frame, by the set of vectors in the Wave Matrix, WVM. In precise mathematical terms, perform a matrix multiplication of the (90×2,938) Wave Matrix by the (2,938×1) Audio Frame Vector. The result is a (90×1) vector designated as Keyboard Transform KBT.

The following operations of SRSA differ from those of RSA. Produce a (m×1) $|KBT|^2$ squared magnitude vector. Index n from 1 to m as follows:

$$|KBT(n)|^2 = KBT^2(n) + KBT^2(n+m)$$

In our example:

$$|KBT(n)|^2 = KBT^2(n) + KBT^2(n+45)$$

Rank these squared magnitudes and note the respective index n for each magnitude squared. Choose the largest six and note their indices.

Create a (d×1) decimated-KBT vector by selecting the indices with the d largest tones. In our example, let d be 12.

Create a (d×d) (e.g., (12×12)) decimated-XWP by selecting only rows and columns of XWP with the same indices.

Invert the decimated-XWP to get a (d×d) decimated-$XWP^{-1}$.

Multiply the decimated-$XWP^{-1}$ by the decimated-KBT to get a (d×1) (e.g., (12×1)) decimated-CSV vector.

Embed the decimated-CSV vector in zeros to form a full (2m×1) (e.g., (90×1)) CSV vector, placing the decimated-CSV elements in their original indices.

To convert from rectangular-form to polar-form of magnitude and phase for the six tones, six n indices embedded from 1 to 45 (i.e., one for each of the m tones in the range):

$$\text{Magnitude: } MSV(n) = \sqrt{CSV^2(n) + CSV^2(n+45)}$$

$$\text{Phase } \Phi(n)\text{: } PSV(n) = \frac{\text{Atan2}[CSV(n+45), CSV(n)]}{2\pi}$$

A tan 2[y, x] means a four-quadrant arctangent function in radians. Phase angles are expressed in units of cycles through division by $2\pi$. The above will result in a Magnitude Spectral Vector MSV and a Phase Spectral Vector PSV for SRSA.

The CSV vector and its polar equivalent MSV and PSV found by SRSA should differ little from that found by the more comprehensive RSA provided that the actual prominent tones are among those selected for analysis by SRSA.

FIG. 7 illustrates an MSV from the SRSA process. Twelve tones of equal magnitude are generated on-pitch at a 440-scale. It is an F-major chord covering five octaves. All twelve tones are accurately detected by the SRSA algorithm. A frame size of 2,938 samples is used. Using RSA to cover a band this wide would be possible theoretically, but difficult in practice because a large (122×122) matrix inversion would be necessary. For a 12 tone maximum selection, SRSA requires only a (24×24) matrix inversion. In the limiting case where all the tones are selected for final analysis, those skilled in the art will recognize that preselection and decimation are not relevant. The inverse matrix $XWP^{-1}$ remains the same from frame to frame and need not be recomputed. RSA is, in effect, a specialized case of the SRSA process.

Limit of Effectiveness

It is not possible to analyze all sound as music. Percussion, for example, cannot easily be separated into distinct tones. In the embodiments, tones are separated by the ratio of 100 cents or about 6% absolute. A tone that is off-key by 50 cents may be considered either 50-cent higher than the lower nominal tone or 50-cent lower than the higher nominal tone. Therefore it is theoretically impossible to analyze it unambiguously. Even before a tone becomes that far off-key, the MSV will show spurious values for supposedly vacant tones. For well tuned instrumental music and disciplined vocal music, the tones are usually not that far off-key. There is always the option of tuning the apparatus to suit the music by adjusting the reference frequency (e.g. from 440) to something else more appropriate. Should the music be undisciplined a capella (unaccompanied) singing when the pitch degenerates very rapidly, it is an artistic judgment call when to retune. The inventor has no suggestion. In some natural music scales, there may be many more notes than 12 in an octave. A D-sharp may be distinct from an E-flat although the two may be very close. It is not recommended that they both be entered as nominal frequencies. Rather a mean-tone should be used as nominal and the pitch "deviation" techniques be used for close-in analysis.

INDUSTRIAL APPLICABILITY

The invention pertains to analysis of digital audio signals and any industry where that may be of value or importance.

I claim:

1. A system for computing quantitative estimates of magnitude, phase, and pitch deviation-from-nominal for each of one or more distinct nominal pitches of a predefined music scale vector in a digital audio frame vector having a plurality of discrete samples, the system including a computer processor configured to:

acquire a wave matrix and an inverse cross-wave matrix, the wave matrix having a cosine wave vector for each distinct nominal pitch, the frequency of the cosine wave being the nominal pitch, and length of the cosine wave vector the number of discrete samples, a sine wave vector for each distinct nominal pitch, the frequency of the sine wave being the nominal pitch, and length of the sine wave vector being the number of discrete samples, such that the number of rows is twice the number of distinct nominal pitches, and the number of columns equal to the number of discrete samples, the inverse cross-wave matrix being the inverse of the matrix multiplication of the wave matrix and the transpose of the wave matrix;

compute a keyboard transform vector, the keyboard transform vector being the combination of a first scalar (dot-product) multiplication and a second scalar (dot-product) multiplication to form the keyboard transform vector such that the number of elements in the keyboard transform vector is twice the number of distinct nominal pitches, the first scalar (dot-product) multiplication being a scalar (dot-product) multiplication of the digital audio frame vector by each cosine wave vector of the wave matrix, and the second scalar (dot-product) multiplication being a scalar (dot-product) multiplication of the digital audio frame vector by each sine wave vector of the wave matrix;

perform a matrix multiplication of the inverse cross-wave matrix by the keyboard transform vector to form a complex spectral vector such that the number of elements in the complex spectral vector is twice the number of distinct nominal pitches;

perform a standard rectangular-to-polar conversion of complex spectral vector for generating a magnitude spectral vector and a phase spectral vector, such that the number of elements in the magnitude spectral vector is the number of distinct nominal pitches, and the number of elements in the phase spectral vector is the number of distinct nominal pitches;

perform a pitch deviation estimate on at least one nominal pitch with prominent magnitude, based on the difference between nominal phase progression between two consecutive audio frames and the actual difference between the phase estimates of the same two frames;

record the estimates in a non-transitory computer readable medium; and display an audio-visual representation of at least one element from the magnitude spectral vector for the user.

2. The system of claim 1, wherein:

the processor configured to acquire the wave matrix is further configured to receive the wave matrix via one of:

read the wave matrix from a memory, receive the wave matrix via one or more computer networks, or compute the wave matrix using the computer processor; and the processor configured to acquire the inverse cross-wave matrix is further configured to receive the inverse cross-wave matrix via one of read the inverse cross-wave matrix from a memory, receive the inverse cross-wave matrix via one or more computer networks, or compute the inverse cross-wave matrix using the computer processor.

3. The system of claim 1, further includes:

a graphical display for a user a visual representation of pitch deviation for at least one nominal pitch with prominent magnitude within the spectral magnitude vector.

4. The system of claim 3, wherein:

the visual representation of pitch deviation for a user for at least one nominal pitch with prominent magnitude is provided by a rotating inhomogeneous figure whose instantaneous angle of orientation equals the difference between two phase estimates of two consecutive audio frames, less the nominal phase progression between the same two audio frames.

5. A method for computing quantitative estimates of magnitude, phase, and pitch deviation-from-nominal for each of one or more distinct nominal pitches of a predefined music scale vector in a digital audio frame vector comprising a plurality of discrete samples, comprising the steps of:

computing a wave matrix and an inverse cross-wave matrix, the wave matrix having a cosine wave vector for each distinct nominal pitch, whereby the frequency of the cosine wave is the nominal pitch, and length of the cosine wave vector is the number of discrete samples, a sine wave vector for each distinct nominal pitch, whereby the frequency of the sine wave is the nominal pitch, and length of the sine wave vector is the number of discrete samples, such that the number of rows is twice the number of distinct nominal pitches, and the number of columns equal to the number of discrete samples, the inverse cross-wave matrix being the inverse of the matrix multiplication of the wave matrix and the transpose of the wave matrix;

computing a keyboard transform vector including performing a first scalar (dot-product) multiplication of the digital audio frame vector by each cosine wave vector of the wave matrix, performing a second scalar (dot-product) multiplication of the digital audio frame vector by each sine wave vector of the wave matrix, combining the first scalar (dot-product) multiplication and the second scalar (dot-product) multiplication to form the keyboard transform vector such that the number of elements in the keyboard transform vector is twice the number of distinct nominal frequencies;

performing a matrix multiplication of the inverse cross-wave matrix by the keyboard transfix vector to form a complex spectral vector such that the number of elements in the complex spectral vector is twice the number of distinct nominal frequencies;

performing a standard rectangular-to-polar conversion of complex spectral vector for generating a magnitude spectral vector and a phase spectral vector, such that the number of elements in the magnitude spectral vector is the number of distinct nominal pitches, and the number of elements in the phase spectral vector is the number of distinct nominal pitches;

perform a pitch deviation estimate on at least one nominal pitch with prominent magnitude, based on the difference between nominal phase progression between two consecutive audio frames and the actual difference between the phase estimates of the same two frames;

record the estimates in a non-transitory computer readable medium; and display an audio-visual representation of at least one element from the magnitude spectral vector for the user.

6. The method of claim 5, wherein:

the processor configured to acquire the wave matrix is further configured to receive the wave matrix via one of:

read the wave matrix from a memory, receive the wave matrix via one or more computer networks, or compute the wave matrix using the computer processor; and the processor configured to acquire the inverse cross-wave matrix is further configured to receive the inverse cross-wave matrix via one of:

read the inverse cross-wave matrix from a memory, receive the inverse cross-wave matrix via one or more computer networks, or compute the inverse cross-wave matrix using the computer processor.

7. The method of claim 5, further includes a graphical display for a user a visual representation of pitch deviation for at least one nominal pitch with prominent magnitude within the spectral magnitude vector.

8. The method of claim 7, wherein:

the visual representation of pitch deviation for a user for at least one aminal pitch with prominent magnitude is provided by a rotating inhomogeneous figure whose instantaneous angle of orientation equals the difference between two phase estimates of two consecutive audio frames less the nominal phase progression between the same two audio frames.

9. A system for computing quantitative estimates of magnitude, phase, and pitch deviation-from-nominal for each of one or more distinct nominal pitches of a predefined music scale vector in a digital audio frame vector a plurality of discrete samples, the system including a computer processor configured to:

acquire a wave matrix and a square cross-wave matrix, the wave matrix having a cosine wave vector for each distinct nominal pitch, the frequency of the cosine wave being the nominal pitch, and length of the cosine wave vector being the number of discrete samples, a sine wave vector for each distinct nominal pitch, the frequency of the sine wave being the nominal pitch, and length of the sine wave vector is the number of discrete samples, such that the number of rows is twice the number of distinct nominal frequencies, and the number of columns equal to the number of discrete samples, the square cross-wave matrix being the matrix multiplication of the wave matrix and the transpose of the wave matrix;

compute a keyboard transform vector, the keyboard transform vector being the combination of a first scalar (dot-product) multiplication and a second scalar (dot-product) multiplication to form the keyboard transform vector such that the number of elements in the keyboard transform vector is twice the number of distinct nominal pitches, the first scalar (dot-product) multiplication being a scalar (dot-product) multiplication of the digital audio frame vector by each cosine wave vector of the wave matrix, and the second scalar (dot-product) multiplication being a scalar (dot-product) multiplication of the digital audio frame vector by each sine wave vector of the wave matrix;

compute a squared magnitude keyboard transform vector by summing the square of a first rectangular component and a second rectangular component for each of the distinct nominal frequencies;

compute a decimated keyboard transform vector by selecting only elements from the complex keyboard transform vector with corresponding to d elements of the squared magnitude keyboard transform having the greatest magnitudes, where d is an integer between one and the number of distinct nominal frequencies, inclusive;

compute a decimated cross-wave matrix by selecting only rows and columns from the square cross-wave matrix corresponding to the d elements of the squared magnitude keyboard transform vector selected in the previous step;

perform a matrix inversion to the decimated cross-wave matrix to form an inverse decimated cross-wave matrix;

perform a matrix multiplication of the inverse decimated cross-wave matrix by the decimated keyboard transform vector to form a decimated complex spectral vector such that the number of elements in the decimated complex spectral vector is twice d;

perform a standard rectangular-to-polar conversion of the decimated complex spectral vector for generating a decimated magnitude spectral vector and a decimated phase spectral vector, such that the number of elements in the magnitude spectral vector is d, and the number of elements in the phase spectral vector is d;

compute a complete magnitude spectral vector by placing elements of the magnitude of the decimated magnitude spectral vector in their respective tonal position and assign zero to all other tonal positions;

compute a complete phase spectral vector by placing elements of the phase of the decimated phase spectral vector in their respective tonal position and assign zero to all other tonal positions;

perform a pitch deviation estimate on at least one nominal pitch with prominent magnitude, based on the difference between nominal phase progression between two consecutive audio frames and the actual difference between the phase estimates of the same two frames;

record the estimates in a non-transitory computer readable medium; and display an audio-visual representation of at least one element from the magnitude spectral vector for the user.

10. The system of claim 9, wherein:

the processor configured to acquire the wave matrix is further configured to receive the wave matrix via one of:

read the wave matrix from a memory, receive the wave matrix via one or more computer networks, or compute the wave matrix using the computer processor, and the processor configured to acquire the square cross-wave matrix is further configured to receive the square cross-wave matrix via one of:

read the square cross-wave matrix from a memory, receive the square cross-wave matrix via one or more computer networks, or compute the square cross-wave matrix using the computer processor.

11. The system of claim 9 further includes a graphical display for a user a visual representation of pitch deviation of at least one nominal pitch with prominent magnitude within the spectral magnitude vector.

12. The system of claim 11, wherein the visual representation of pitch deviation for a user for at least one nominal pitch with prominent magnitude is provided by a rotating inhomogeneous figure whose angle of orientation equals the difference between two consecutive phase estimates of two audio frames less the nominal phase progression from the same two audio frames.

13. A method for computing quantitative estimates of magnitude, phase, and pitch deviation-from-nominal for each of one or more distinct nominal pitches of a predefined music scale vector in a digital audio frame vector a plurality of discrete samples, the system comprising a computer processor configured to:

acquire a wave matrix and a square cross-wave matrix, the wave matrix having a cosine wave vector for each distinct nominal pitch, the frequency of the cosine wave being the nominal pitch, and length of the cosine wave vector being the number of discrete samples, a sine wave vector for each distinct nominal pitch, the frequency of the sine wave being the nominal pitch, and length of the sine wave vector is the number of discrete samples, such that the number of rows is twice the number of distinct nominal frequencies, and the number of columns equal to the number of discrete samples;

the square cross-wave matrix being the matrix multiplication of the wave matrix and the transpose of the wave matrix;

compute a keyboard transform vector, the keyboard transform vector being the combination of a first scalar (dot-product) multiplication and a second scalar (dot-product) multiplication to form the keyboard transform vector such that the number of elements in the keyboard transform vector is twice the number of distinct nominal pitches, the first scalar (dot-product) multiplication being a scalar (dot-product) multiplication of the digital audio frame vector by each cosine wave vector of the wave matrix, and the second scalar (dot-product) multiplication being a scalar (dot-product) multiplication of the digital audio frame vector by each sine wave vector of the wave matrix;

compute a squared magnitude keyboard transform vector by summing the square of a first rectangular component and a second rectangular component for each of the distinct nominal frequencies;

compute a decimated keyboard transform vector by selecting only elements from the complex keyboard transform vector with corresponding to d elements of the squared magnitude keyboard transform having the greatest magnitudes, where d is an integer between one and the number of distinct nominal frequencies, inclusive;

compute a decimated cross-wave matrix by selecting only rows and columns from the square cross-wave matrix corresponding to the d elements of the squared magnitude keyboard transform vector selected in the previous step;

perform a matrix inversion to the decimated cross-wave matrix to form an inverse decimated cross-wave matrix;

perform a matrix multiplication of the inverse decimated cross-wave matrix by the decimated keyboard transform vector to form a decimated complex spectral vector such that the number of elements in the decimated complex spectral vector is twice d;

perform a standard rectangular-to-polar conversion of the decimated complex spectral vector for generating a decimated magnitude spectral vector and a decimated phase spectral vector, such that the number of elements in the magnitude spectral vector is d, and the number of elements in the phase spectral vector is d;

compute a complete magnitude spectral vector by placing elements of the magnitude of the decimated magnitude spectral vector in their respective tonal position and assign zero to all other tonal positions;

compute a complete phase spectral vector by placing elements of the phase of the decimated phase spectral vector in their respective tonal position and assign zero to all other tonal positions;

perform a pitch deviation estimate on at least one nominal pitch with prominent magnitude, based on the difference between nominal phase progression between two consecutive audio frames and the actual difference between the phase estimates of the same two frames;

record the estimates in a non-transitory computer readable medium; and display an audio-visual representation of at least one element from the complete magnitude spectral vector for the user.

14. The method in claim 13 wherein, the processor configured to acquire the wave matrix is further configured to receive the wave matrix via one of:

read the wave matrix from a memory, receive the wave matrix via, one or more computer networks, or compute the wave matrix using the computer processor; and the processor configured to acquire the square cross-wave matrix is further configured to receive the square cross-wave matrix via one of:

read the square cross-wave matrix from a memory, receive the square cross-wave matrix via one or more computer networks, or compute the square cross-wave matrix using the computer processor.

15. The method of claim 13 further includes a graphical display for a user a visual representation of pitch deviation of at least one nominal pitch with prominent magnitude within the spectral magnitude vector.

16. The method of claim 15 wherein the visual representation of pitch deviation for a user for at least one nominal pitch with prominent magnitude is provided by a rotating inhomogeneous figure whose angle of orientation equals the difference between two consecutive phase estimates of two audio frames less the nominal phase progression from the same two audio frames.

* * * * *